United States Patent
Kim et al.

(10) Patent No.: US 8,325,930 B2
(45) Date of Patent: Dec. 4, 2012

(54) SIGNAL PROCESSING APPARATUS AND CONTROL METHOD THEREOF

(75) Inventors: Won-seok Kim, Uiwang-si (KR); Je-ik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1302 days.

(21) Appl. No.: 12/045,282

(22) Filed: Mar. 10, 2008

(65) Prior Publication Data

US 2009/0033390 A1  Feb. 5, 2009

(30) Foreign Application Priority Data

Aug. 1, 2007 (KR) .................. 10-2007-0077432

(51) Int. Cl.
*H04H 20/47* (2008.01)
*H04H 20/88* (2008.01)
*H04H 40/36* (2008.01)

(52) U.S. Cl. ............... 381/2; 381/74; 381/77; 381/309; 381/311

(58) Field of Classification Search .................. None
See application file for complete search history.

(56) References Cited

U.S. PATENT DOCUMENTS

| | | | |
|---|---|---|---|
| 7,088,832 | B1 | 8/2006 | Cooper |
| 7,324,462 | B1 | 1/2008 | Page et al. |
| 7,365,766 | B1 | 4/2008 | Lapalme |
| 7,634,227 | B2 | 12/2009 | de Jong |
| 7,653,344 | B1 | 1/2010 | Feldman et al. |
| 2004/0139180 | A1 | 7/2004 | White et al. |
| 2006/0140265 | A1 | 6/2006 | Igler et al. |
| 2006/0217061 | A1 | 9/2006 | Steele et al. |
| 2007/0110110 | A1 | 5/2007 | Miki et al. |
| 2007/0211624 | A1 | 9/2007 | Schmidt |
| 2007/0232222 | A1* | 10/2007 | de Jong ................ 455/3.06 |
| 2008/0138032 | A1* | 6/2008 | Leyendecker et al. ....... 386/66 |
| 2009/0033390 | A1 | 2/2009 | Kim et al. |
| 2009/0091655 | A1 | 4/2009 | Russell et al. |
| 2009/0135856 | A1 | 5/2009 | Gha et al. |

FOREIGN PATENT DOCUMENTS

| | | |
|---|---|---|
| EP | 1 619 902 A2 | 1/2006 |
| EP | 1 657 929 A1 | 5/2006 |
| EP | 1657929 A1 * | 5/2006 |
| JP | 2004-320424 A | 11/2004 |
| KR | 10-2006-0080606 A | 7/2006 |

OTHER PUBLICATIONS

Communication (European Search Report) dated Mar. 16, 2010 from the European Patent Office in counterpart EP application No. 08153638.5.
Office Action dated Dec. 16, 2010, for U.S. Patent Appl. No. 12/138,613.
Communication dated Aug. 17, 2011 issued by the European Patent Office in counterpart European Patent Application No. 08153638.5.
Office Action dated Jul. 14, 2010 in U.S. Appl.No. 12/138,613.

* cited by examiner

*Primary Examiner* — Evan Pert
*Assistant Examiner* — Leslie Pilar Cruz
(74) *Attorney, Agent, or Firm* — Sughrue Mion, PLLC

(57) ABSTRACT

A signal processing apparatus and a control method thereof are provided. The signal processing apparatus includes: a signal processor which respectively processes an input video signal and an input audio signal; a communication unit which is communicably linked with an external audio output unit that outputs the audio signal; and a controller which controls the signal processor to delay and process one of the video signal and the audio signal by a delay value corresponding to the external audio output unit if the external audio output unit is predetermined.

16 Claims, 4 Drawing Sheets

FIG. 2

| IDENTIFYING INFORMATION | DELAY TIME | DELAY VALUE |
|---|---|---|
| A | 100ms | -100ms |
| B | 150ms | -150ms |
| C | -20ms | 20ms |

SIGNAL PROCESSING APPARATUS AND CONTROL METHOD THEREOF

CROSS-REFERENCE TO RELATED APPLICATION

This application claims priority from Korean Patent Application No. 10-2007-0077432, filed on Aug. 1, 2007 in the Korean Intellectual Property Office, the disclosure of which is incorporated herein by reference.

BACKGROUND OF THE INVENTION

1. Field of Invention

Apparatuses and methods consistent with the present invention relate to a signal processing apparatus and a control method thereof, and more particularly, to a signal processing apparatus which communicates with an audio output apparatus connected thereto by wireless links to output an audio signal, and a control method thereof 2. Description of Related Art Recently, as a technology in an electronic apparatus field has been rapidly developed and a user requires various functions, a communication system in which electronic apparatuses having different functions are connected one another to provide various functions by data communication among the electronic apparatuses.

"Bluetooth" is defined to remove the connection cables by Ericsson. Bluetooth is one of a local area network and a standard or a product which makes an interactive communication available by wireless links in a real time.

An electronic apparatus for supporting the Bluetooth function such as a display apparatus, a computer, a portable electronic apparatus, or the like may communicate with an audio output apparatus such as a speaker and a headset supporting the Bluetooth function to output an audio signal.

If the audio signal is output to the audio output apparatus supporting the Bluetooth function, times for outputting the video signal and the audio signal are different to each other so that the video signal and the audio signal may not be synchronized. However, the times outputting the audio signals are different according to the type of the audio output apparatuses so that a compensation value can not be set to synchronize the video signal and the audio signal.

SUMMARY OF THE INVENTION

The present invention provides a signal processing apparatus which can recognize an audio output apparatus wirelessly connected thereto, compensates an audio signal according to the recognized audio output apparatus to synchronize the audio signal and a video signal, and a control method thereof According to an aspect of the present invention, there is provided a signal processing apparatus including: a signal processor which respectively processes an input video signal and an input audio signal; a communication unit which communicates with an external audio output unit outputting the audio signal; and a controller which controls the signal processor to delay and process one of the video signal and the audio signal by a delay value corresponding to the external audio output unit if the external audio output unit connected through the communication unit is predetermined.

The signal processing apparatus may further include a storage which stores the delay value.

The controller may recognize the delay value corresponding to identifying information of the connected external audio output unit, and control the signal processor to delay and process one of the video signal and the audio signal based on the recognized delay value.

If the delay value of the connected external audio output unit is input from one of a user and an external apparatus, the input delay value may be stored in the storage.

The controller may provide a user interface (UI) through which the user is capable of inputting the delay value.

The communication unit may include a Bluetooth communication module.

The signal processing apparatus may further include a signal storage which stores at least one of the video and audio signals; wherein the controller stores one output earlier between the video signal and the audio signal in the signal storage and outputs the signal stored in the storage if an amount of time corresponding to the delay value passes.

According to another aspect of the present invention, there is provided a control method of a signal processing apparatus, including: processing an input video signal and an input audio signal respectively; communicating with an external audio output unit outputting the audio signal; determining whether the connected external audio output unit is predetermined or not; and delaying and outputting one of the video signal and the audio signal by a delay value corresponding to the connected external audio output signal if the external audio output unit is predetermined.

The control method may further include storing the delay value.

The delaying and outputting the video signal and the audio signal may include recognizing the delay value corresponding to identifying information of the connected external audio output unit, and delaying and processing one of the video signal and the audio signal based on the recognized delay value.

The storing the delay value may include storing the input delay value if the delay value of the connected external audio output unit is input from one of a user and an external apparatus.

The control method may further include providing a UI through which the user inputs the delay value of the connected external audio output unit so as to receive the delay value.

The communicating with the external audio output unit may include communicating by a Bluetooth function.

The delaying and outputting the video signal and the audio signal may include storing one output earlier between the video signal and the audio signal; and outputting the stored signal if an amount of time corresponding to the delay value passes.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 2 illustrates a stored delay value corresponding to identifying information of an external audio output unit according to an exemplary embodiment of the present invention.

DETAILED DESCRIPTION OF EXEMPLARY EMBODIMENTS OF THE INVENTION

Figure 1:
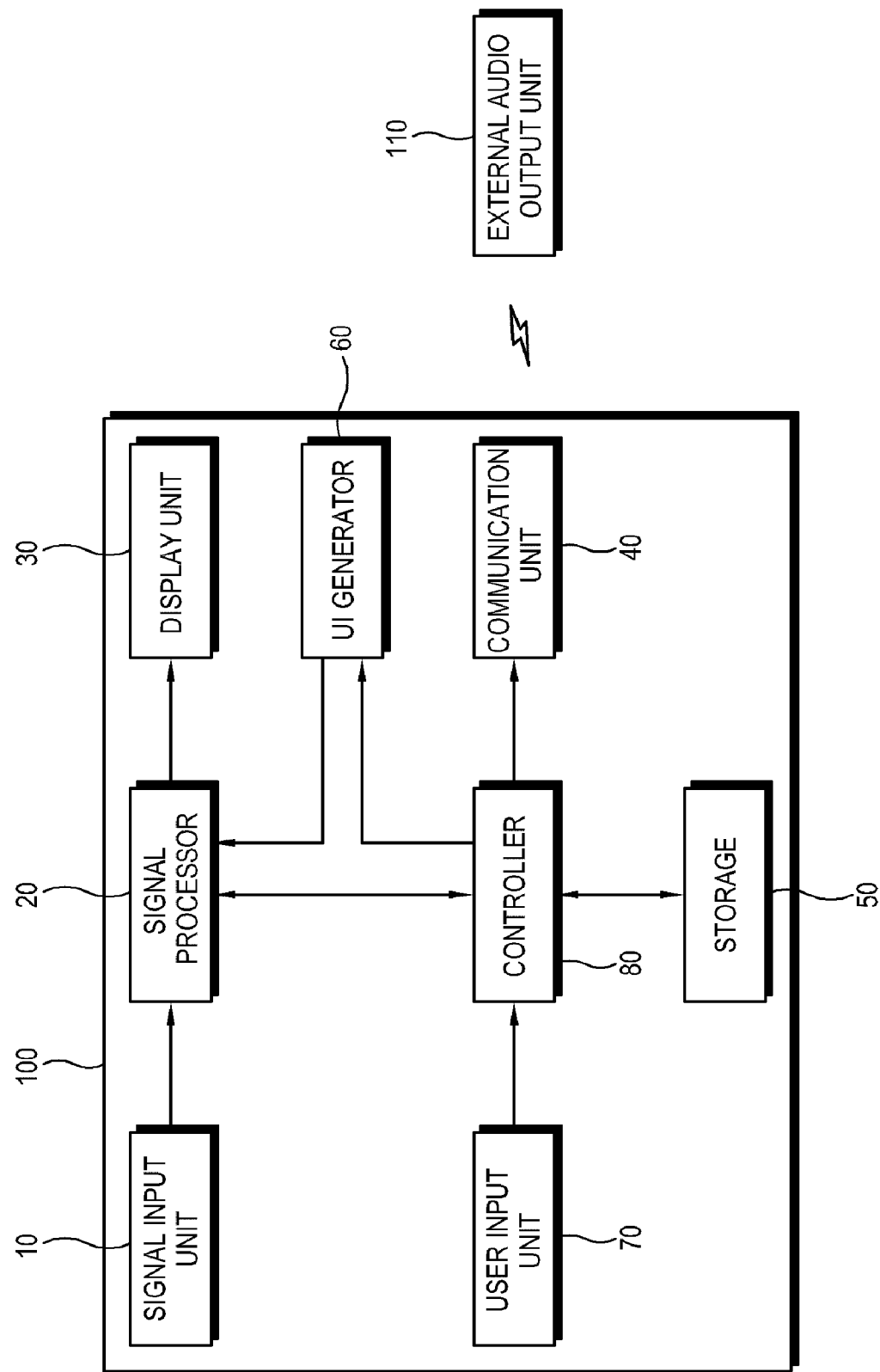
FIG. 1 is a control block diagram of a signal processing system according to an exemplary embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

As shown in FIG. 1, a signal processing system according to an exemplary embodiment of the present invention includes a signal processing apparatus 100 and an external audio output unit 110. The signal processing apparatus 100 includes a signal input unit 10, a signal processor 20, a display unit 30, a communication unit 40, a storage 50, a UI generator 60, a user input unit 70 and a controller 80.

The signal input unit 10 receives a video signal and may include a tuner unit (not shown) receiving a broadcasting signal and an external connection terminal (not shown) receiving the video signal from an external apparatus.

The tuner unit may include one or more tuners, a demodulator that demodulates a tuned signal, a decoder, a multiplexer and so on. The tuner unit tunes the broadcasting signal having a frequency bandwidth corresponding to a tuning control signal of the controller 80 to be described later. In the case of a digital broadcasting signal, the demodulator outputs the broadcasting signal into a transport stream format after performing a vestigial side band (VSB) demodulating process and an error correcting process and so on. Here, the tuner includes an analog tuner and a digital tuner or includes a multi-tuner so as to receive both of an analog broadcasting signal and a digital broadcasting signal.

Also, the external connection terminal may include connectors of various types to receive the video signals having various formats. For example, the signal input unit 10 may include at least one of a D-sub connector, a Composite Video Baseband Signal (CVBS) connector, an S-Video connector and a component connector to receive the video signal.

The signal processor 20 processes the video and audio signals input through the signal input unit 10, and may include a video processor (not shown) that processes the video signal and an audio processor (not shown) that processes the audio signal. The signal processor 20 according to the present embodiment outputs the processed video signal to the display unit 30 and outputs the processed audio signal to the external audio output unit 110.

The video processor may have various functions corresponding to the formats of the video signals. For example, the various functions may include an analog to digital (A/D) converting function to convert the input video signals having various formats to digital video signals having a certain format, a digital decoding function, a scaling function to adjust the received digital and/or analog video signals to have a suitable vertical frequency, resolution, picture ratio, etc.

Moreover, the audio processor may include an audio amplifier (not shown) that amplifies the audio signal and outputting the amplified audio signal to the external audio output unit 110.

The display unit 30 displays an image processed in the video processor and may include various display modules such as a Cathode Ray Tube (CRT), a Digital Light Processing (DLP), a Liquid Crystal Display (LCD), a Plasma Display Panel (PDP) and so on. Also, the display unit 30 may be separately provided in the outside of the signal processing apparatus 100.

The communication unit 40 communicates with the external audio output unit 110 that outputs the processed audio signal, and includes a Bluetooth module supporting Bluetooth communication. Furthermore, the communication unit 40 communicates with the external audio output unit 110 to cause the external audio output unit 110 output the processed audio signal.

The user input unit 70 may include a remote controller and/or a menu key on a casing (not shown) to input a delay value for delaying one of the video signal and the audio signal, and a key signal generator which generates a key signal in response to manipulation of the remote controller or the menu key, so that a user can input the delay value. The user input unit 70 may further include a number key, a direction key, a function key through which the user selects a function of the signal processing apparatus 100, and so on.

The UI generator 60 generates a UI through which the user can input the delay value if the delay value of the connected external audio output unit 110 is not stored. The UI generator 60 may include an OSD generator. The UI generated in the UI generator 60 is displayed on the display unit 30.

The storage 50 stores the delay value corresponding to identifying information of the external audio output unit 110, and includes a non-volatile memory such as a flash ROM in which data may be supplemented and corrected. The storage 50 according to the present embodiment, as shown in FIG. 2, stores the identifying information of the external audio output unit 110 and the delay value based on a delay time corresponding to the identifying information of the external audio output unit 110.

The delay time is defined as a time difference between times when the processed video signal and the processed audio signal are output, and the delay value is set to delay a signal which is output earlier between the video signal and the audio signal according to the delay time. The delay value may be set in a manufacturing process or input by the user or from an external apparatus.

The delay value according to the present embodiment may be set as a minus (−) value if the audio signal is output later than the video signal, and set as a plus (+) value if the audio signal is output earlier than the video signal.

The controller 80 delays one of the video signal and the audio signal according to the connected external audio output unit 110, and may include a CPU and a microcomputer, etc.

Specifically, the controller 80 determines whether the connected external audio output unit 110 is predetermined if the external audio output unit 110 is connected through the communication unit 40. In other words, the controller 80 recognizes the identifying information of the connected external audio output unit 110 so as to determine whether the delay value of the external audio output unit 110 is stored or not. Here, the identifying information may be output from the external audio output unit 110 through the communication unit 40.

Then, the controller 80 checks the delay value in the storage 50 corresponding to the identifying information of the connected external audio output unit 110, and controls the signal processor 20 to delay and process one of the video signal and the audio signal based on the checked delay value.

The signal processing apparatus 100 further includes a signal storage (not shown). The signal storage may be provided inside or outside of the signal processor 20.

The controller 80 stores the signal output earlier between the video and audio signals in the signal storage, and controls the signal processor 20 to output the signal stored in the signal storage if an amount of time corresponding to the delay value passes.

For example, if the audio signal is output later than the video signal, the controller 80 stores the processed video signal in the signal storage and controls the signal processor 20 to output the video signal stored in the signal storage when an amount of time corresponding to the delay value passes. On the other hand, if the audio signal is output earlier than the video signal, the controller 80 stores the processed audio signal in the signal storage and controls the signal processor 20 to output the audio signal when an amount of time corresponding to the delay value passes.

Referring to FIG. 2, if B is the identifying information of the connected external audio output unit 110, the audio signal is delayed by 150 ms to be later than the video signal. Therefore, the controller 80 stores the video signal in the signal storage, and controls the signal processor 20 to output the video signal in the signal storage if 150 ms corresponding to the delay value, −150 ms, passes.

If C is the identifying information of the connected external audio output unit 110, the audio signal is delayed by −20 ms to be earlier than the video signal. Thus, the controller 80 stores the audio signal in the signal storage to output the audio signal after delaying 20 ms. Accordingly, the controller 80 controls the signal processor 20 to output the audio signal in the signal storage if 20 ms passes to correspond to the delay value, 20 ms.

If the storage 50 does not store the identifying information of the connected external audio output unit 110, the controller 80 controls the UI generator 80 to generate the UI through which the user is capable of inputting the delay value. The user may input the delay value through the user input unit 70 after checking the output of the processed video and audio signals.

Then, the controller 80 controls the signal processor 20 to delay and process one of the video and audio signals based on the delay value input by the user so that the user can determine whether the output video and audio signals are synchronized or not. Thus, the user is capable of inputting the delay value repeatedly if the output video and audio signals are not still synchronized with each other.

The delay value may be input by the user as described above or from an external apparatus if the delay value of the connected external audio output unit 110 is not predetermined. For instance, the delay value may be stored in the external audio output unit 110. In this case, if the external apparatus is connected to the signal processing apparatus 100, the external audio output unit 110 transmits the identifying information and the delay value to the signal processing apparatus 100. Next, the controller 80 stores the received identifying information and delay value in the storage 50 and controls the signal processor 20 to delay and process one of the video and audio signals based on the delay value.

As described above, if the signal processing apparatus 100 is connected to the external audio output unit 110 by wireless links, the connected external audio output unit 110 is recognized, and thus, the video and audio signals can be synchronized. Further, the video and audio signals can be synchronized without depending on the type of the connected external audio output unit 110 through the identification of the connected external audio output unit 110.

Hereinafter, a control method of the signal processing apparatus 100 according to an exemplary embodiment of the present invention will be described by referring to FIG. 3.

Figure 3:
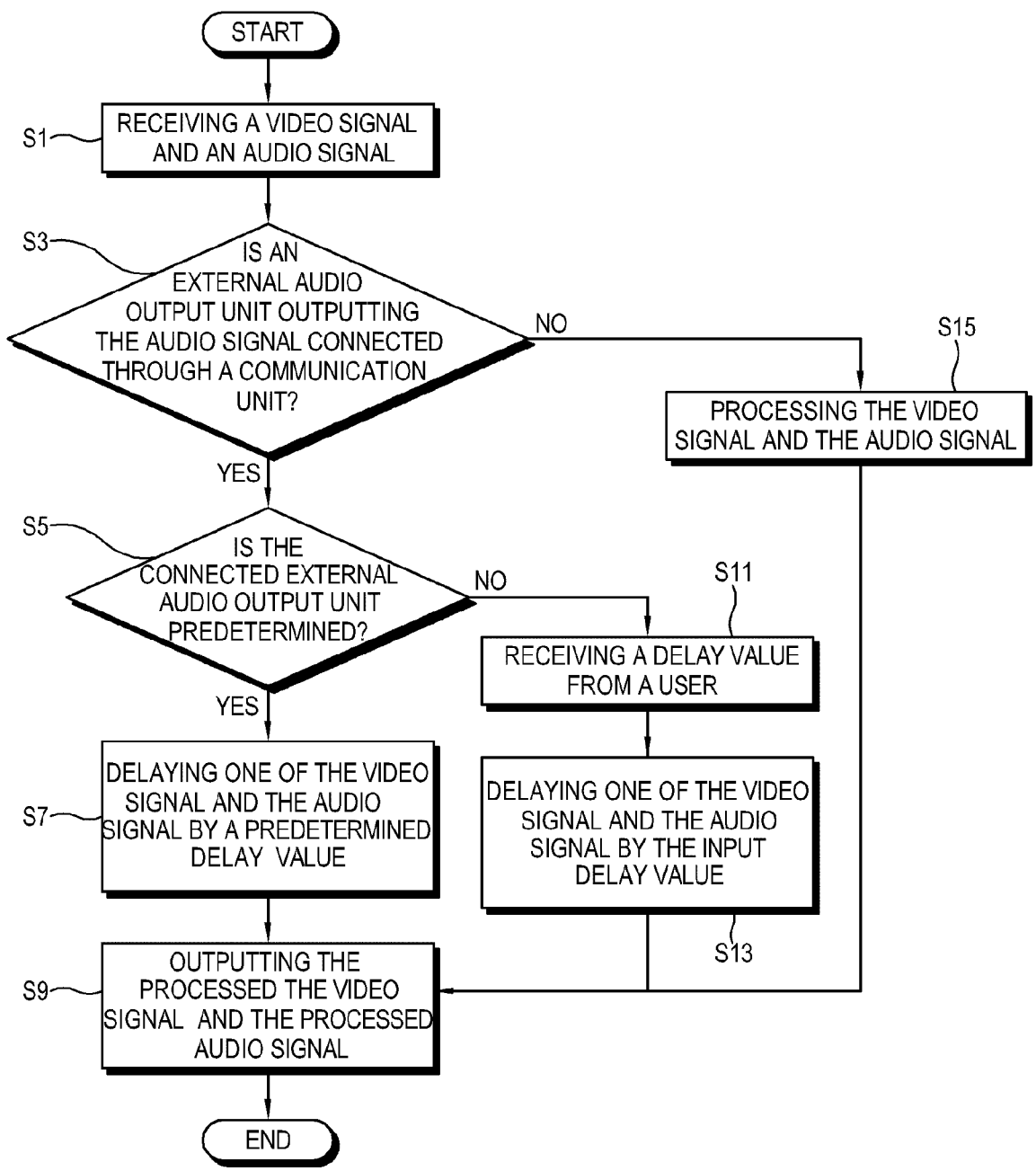
FIGS. 3 and 4 are flow charts illustrating control processes of a signal processing apparatus according to an exemplary embodiment of the present invention.

As shown in FIG. 3, the video and audio signals are input at operation S1, and it is determined whether the external audio output unit 110 outputting the audio signal is connected through the communication unit 40 at operation S3.

If it is determined that the connected external audio output unit 110 is connected through the communication unit 40, it is determined whether the connected external audio output unit 110 is predetermined at operation S5.

If it is determined that the connected external audio output unit 110 is predetermined, the controller 80 controls the signal processor 20 to delay and process one of the video and audio signals by a predetermined delay value at operation S7. Next, the processed video and audio signals are output at operation S9.

Then, as described above, the controller 80 stores the signal which is output earlier between the video and audio signals in the signal storage, and controls the signal processor 20 to output the stored signal in the signal storage if an amount of time corresponding to the delay value passes.

If it is determined at operation S5 that the connected external audio output unit 110 is not predetermined, the delay value is input by the user at operation S11. Then, as described above, the controller 80 may control the UI generator 60 to generate the UI so that the user can input the delay value.

Next, the controller 80 controls the signal processor 20 to delay and process one of the video signal and the audio signal by the input delay value at operation S13. Then, the processed video and audio signals are output at operation S9.

If it is determined in operation S3 that the external audio output unit 110 is not connected through the communication unit 40, the signal processing apparatus 100 processes the video and audio signals at operation S15, and outputs the processed video and audio signals at operation S9.

Hereinafter, a detailed control method of the signal processing apparatus 100 according to the exemplary embodiment of the present invention will be described by referring to FIG. 4.

Figure 4:
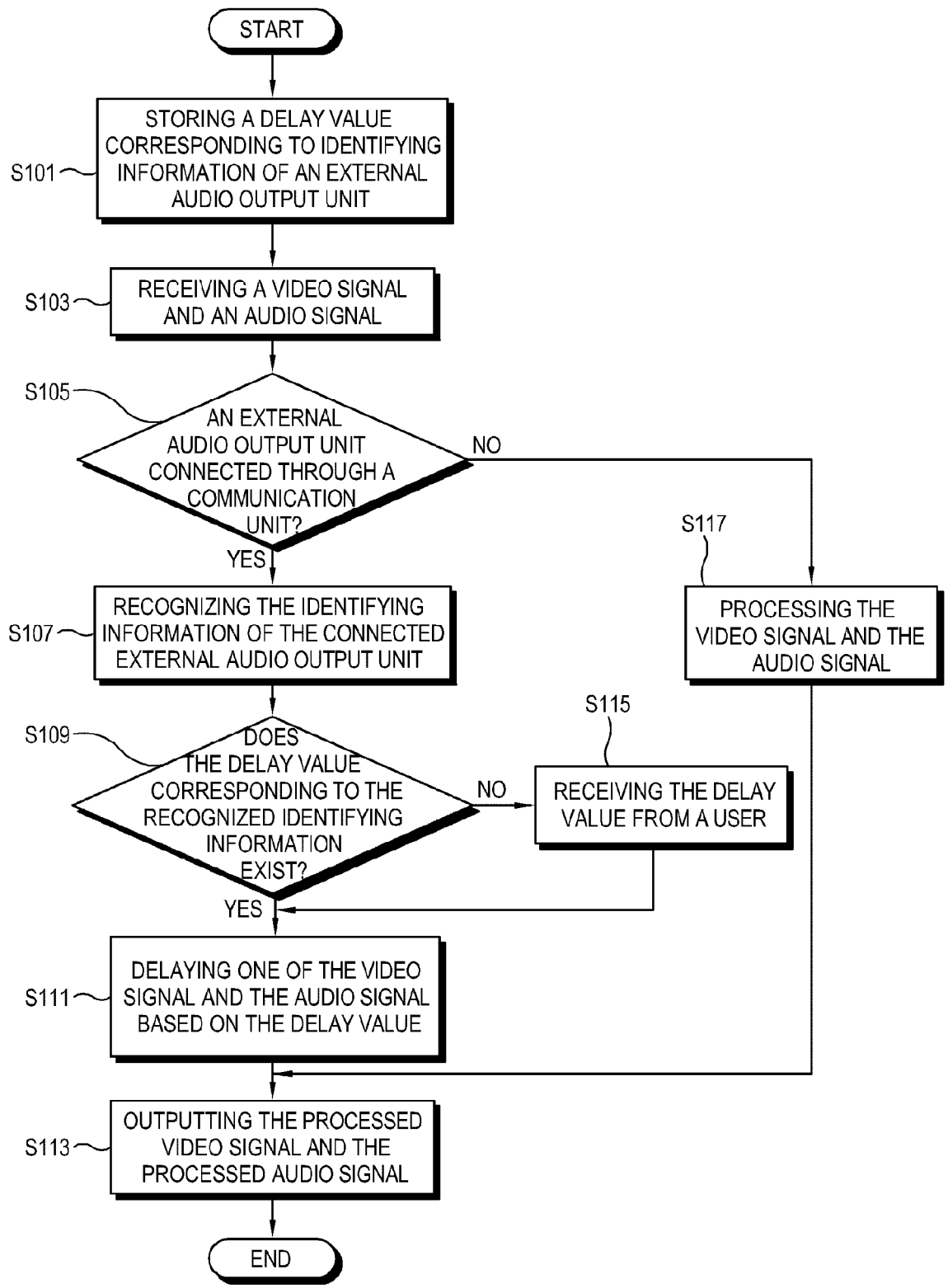

As shown in FIG. 4, the signal processing apparatus 100 stores the delay value corresponding to the identifying information of the external audio output unit 110 in the storage 50 at operation S101.

Then, the video and audio signals are input at operation S103, and it is determined whether the external audio output unit 110 outputting the audio signal is connected through the communication unit 40 at operation S105.

If it is determined that the external audio output unit 110 is connected through the communication unit 40, the controller 80 recognizes the identifying information of the connected external audio output unit 110 at operation S107.

Next, it is determined whether the delay value corresponding to the identifying information is stored in the storage 50 at operation S109.

If it is determined that the delay value is stored in the storage 50, the controller 80 controls the signal processor 20 to delay and process one of the video and audio signals based on the stored delay value at operation S111, and outputs the processed video and audio signals at operation S113.

If it is determined at operation S109 that the delay value is not stored in the storage 50, the delay value is input from the user at operation S115.

Next, the controller 80 controls the signal processor 20 to delay and process one of the video signal and the audio signal by the input delay value at operation S111, and outputs the processed video and audio signals at operation S113.

If it is determined at operation S105 that the external audio output unit 110 is not connected thereto, the input video signal and the audio signal are processed at operation S117, and the processed video and audio signals are output at operation SI 13.

In this way, if the signal processing apparatus 100 is connected to the external audio output unit 110 by wireless links, the connected external audio output unit 110 is identified, and thus, the video and audio signals can be synchronized. Further, the video and audio signals can be synchronized without depending on the type of the connected external audio output unit 110 through the identification of the connected external audio output unit 110.

Hereinafter, a signal processing apparatus according to a second exemplary embodiment of the present invention will be described. Here, any description of the identical and corresponding elements will not be repeated.

In the first exemplary embodiment, the delay value is defined as the time difference between times when the processed video signal and the processed audio signal are output with respect to the wirelessly connected external audio output unit 110. However, in the second embodiment, the video signal is delayed by a predetermined amount of time and the delay time is defined as the amount of time that the audio signal is output earlier than the delayed video signal.

The storage 50 stores a video delay value to delay the video signal by a predetermined amount of time and an audio delay value which is the amount of time that the audio signal is output earlier than the delayed video signal. The audio delay value includes the identifying value of the external audio output unit 110 and the delay value to delay the audio signal to correspond to the identifying value of the external audio output unit 110.

The controller 80 controls the signal processor 20 to delay and process the video signal according to the video delay value and delay and process the audio signal by the audio delay value corresponding to the identifying information of the connected external audio output unit 110 if the external audio output unit 110 is connected thereto. As described above, according to the present invention, there are provided a signal processing apparatus and a control method thereof which can recognize identifying information of the external audio output unit wirelessly connected thereto, and delay one of the video signal and the audio signal according to the identifying information of the audio output unit to synchronize the video and audio signals to be output.

Further, there are provided a signal processing apparatus and a control method thereof which can synchronize the video and audio signals irrespective of the type of the audio output unit.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A signal processing apparatus comprising:
   a signal processor which processes a video signal and an audio signal;
   a communication unit which is communicably linked with an external audio output apparatus to output the processed audio signal to the external audio output apparatus;
   a display unit to which the signal processor outputs the processed video signal; and
   a controller which controls to compensate for a delay occurring differently due to a type of the external audio output apparatus, by delaying the video signal by a delay value corresponding to the external audio output apparatus and outputting the delayed video signal to the display unit, or by delaying the audio signal by the delay value corresponding to the external audio output apparatus and outputting the audio signal, if the type of the external audio output apparatus is identified.

2. The signal processing apparatus according to claim 1, wherein the communication unit comprises a Bluetooth communication module.

3. The signal processing apparatus according to claim 1, further comprising a signal storage in which at least one of the video signal and the audio signal is stored,
   wherein the controller stores one signal output earlier between the video signal and the audio signal in the signal storage and outputs the signal stored in the storage if an amount of time corresponding to the delay value passes.

4. The signal processing apparatus according to claim 1, wherein the controller presets the delay value as a minus value if the audio signal is output later than the video signal, and presets the delay value as a plus value if the audio signal is output earlier than the video signal.

5. The signal processing apparatus according to claim 1, further comprising a user input unit which transmits input by a user to the controller,
   wherein the controller receives the delay value input from the user input unit according to manipulation by the user if the type of the external audio output apparatus is not identified.

6. The signal processing apparatus according to claim 1, further comprising a storage in which delay values corresponding to respective types of external output apparatuses are stored in advance.

7. The signal processing apparatus according to claim 6, wherein the controller recognizes the delay value corresponding to identifying information of the external audio output apparatus, and
   controls the signal processor to delay and process one of the video signal and the audio signal based on the recognized delay value.

8. The signal processing apparatus according to claim 1, wherein the delay value is input from one of a user and an external apparatus if the type of the external audio output apparatus is not identified, and
   the input delay value is stored in a storage.

9. The signal processing apparatus according to claim 8, wherein the controller provides a user interface through which the delay value is input.

10. A control method of a signal processing apparatus, the control method comprising:
    processing a video signal and an audio signal;
    communicating with an external audio output apparatus that outputs the audio signal;
    determining whether a type of the external audio output apparatus is identified; and
    compensating for a delay occurring differently due to the type of the external audio output apparatus, by delaying the video signal by a delay value corresponding to the external audio output apparatus and outputting the delayed video signal to a display unit, or by delaying the audio signal by the delay value corresponding to the external audio output apparatus and outputting the audio signal, if it is determined that the type of the external audio output apparatus is identified.

11. The control method according to claim 10, wherein the delaying and outputting the video signal and the audio signal comprises storing one signal output earlier between the video signal and the audio signal; and
    outputting the stored signal if an amount of time corresponding to the delay value passes.

12. The control method according to claim 10, further comprising storing, in advance, delay values corresponding to respective types of external output apparatuses.

13. The control method according to claim 12, wherein the delaying and outputting the video signal and the audio signal comprises recognizing the delay value corresponding to identifying information of the external audio output apparatus, and delaying and processing one of the video signal and the audio signal based on the recognized delay value.

14. The control method according to claim 10, further comprising:

inputting the delay value from one of a user and an external apparatus if the type of the external audio output apparatus is not identified, and storing the input delay value when the delay value is input from one of the user and the external apparatus.

15. The control method according to claim 14, further comprising providing a user interface through which the delay value is input.

16. The control method according to claim 10, wherein the communicating with the external audio output apparatus comprises communicating by a Bluetooth function.

* * * * *